United States Patent [19]
Kurimoto et al.

[11] 3,725,987
[45] Apr. 10, 1973

[54] MACHINE TOOL WITH SPACED TURRET HEADS MOUNTED ON A CROSS SLIDE

[75] Inventors: Mikishi Kurimoto, Nagoya; Yoshiki Ochiai, Okazaki; Kenji Nomura, Aichi-ken; Akira Tsuboi, Hekinan, all of Japan

[73] Assignee: Toyoda Koki Kabushiki Kaisha, Kariya-shi, Aichi-ken, Japan

[22] Filed: Oct. 13, 1971

[21] Appl. No.: 189,051

[52] U.S. Cl. .................................29/27 C, 29/36, 29/40
[51] Int. Cl. ..................................................B23b 7/04
[58] Field of Search ..........................29/36, 39, 27 C, 29/40, 47, 35.5, 48.5, 38 B; 82/36 A

[56] References Cited

UNITED STATES PATENTS

| | | | |
|---|---|---|---|
| 3,643,307 | 2/1972 | Ledergerber et al. | 29/38 B |
| 3,486,209 | 12/1969 | Shultz et al. | 29/27 C |

FOREIGN PATENTS OR APPLICATIONS

| | | | |
|---|---|---|---|
| 1,066,767 | 9/1964 | Great Britain | 29/36 |

*Primary Examiner*—Gil Weidenfeld
*Attorney*—Norman F. Oblon et al.

[57] ABSTRACT

A machine tool is provided with two turret heads indexably mounted in spaced relation on a common carriage. One of the turret heads rotatably mounts a plurality of tool spindles for drivingly receiving rotary cutting tools. The other of the turret heads fixedly supports a plurality of stationary cutting tools. The tool spindles are rotated by a driving device having a power source common to a workpiece driving device wherein the workpiece is rotatable about its own axis. The common carriage is movable either in the axial direction or in the radial direction of the workpiece. An indexing device is selectively connected to a main spindle mounting the workpiece supporting device for angularly indexing the workpiece and another indexing device selectively indexes the turret heads for angularly positioning a desired tool in a machining zone.

12 Claims, 8 Drawing Figures

MACHINE TOOL WITH SPACED TURRET HEADS MOUNTED ON A CROSS SLIDE

BACKGROUND OF THE INVENTION

The present invention generally relates to a machining center, and more particularly to an improved machine tool with two turret heads indexably mounted in spaced relation on a common cross slide, wherein one of the turret heads rotatably mounts a plurality of tool spindles for drivingly supporting rotary cutting tools and the other of the turret heads mounts a plurality of stationary cutting tools for turning.

In "turning machines", such as lathes, machining operations are performed by using tools of the type which are maintained stationary in a tool operator or a tool rest, so that the metal removing capability is necessarily restricted within turning, drilling of the central portion of a workpiece, and boring of its concentrical portion. With this condition, it is necessary to transfer a workpiece from one machine tool to another in order to perform desired different machining operations thereon which require a rotary cutting tool, such as a drill, a milling cutter, a grinding wheel, or the like.

SUMMARY OF THE INVENTION

It is, therefore, an object of the present invention to provide an improved machine tool which respectively mounts both stationary and rotary cutting tools and is thus able to accomplish a greater variety of machining operations, whereby the metal removing ability and efficiency is very high.

It is another object of the present invention to provide an economical machine tool with a simple driving mechanism for a workpiece and tool spindles and a simple driving mechanism for tool-supporting heads.

Still another object of the present invention is to provide a safety machine tool with turret heads being mounted on a cross slide in spaced relation so as to be prevented from interfering with each other due to mistaken movements.

It is yet another object of the present invention to provide an improved machine tool with a driving device having a single power source being capable of selectively rotating either a workpiece clamped in a chuck or an indexed tool spindle of a turret head.

It is still a further object of the present invention to provide a machine tool with an improved indexing device having a common power source for selectively indexing turret heads mounted on a cross slide through novel coupling members.

Briefly, according to the present invention, these and other objects are achieved by providing a machine tool which comprises a frame, a spindle rotatably mounted on the frame, a device selectively connected to the spindle for indexing a workpiece, means mounted on the spindle for drivingly supporting the workpiece, a saddle slidably mounted on the frame, a feed device mounted on the frame for moving the saddle toward and away from the workpiece, a cross slide slidably mounted on the saddle, a feed device mounted on the saddle for moving the cross slide across the sliding direction of the saddle, a first turret head for rotatably mounting a plurality of tool spindles adapted to drivingly receive rotary cutting tools, a second turret head for mounting stationary cutting tools, the first and second turret heads being individually indexably mounted at spaced points on the cross slide, an indexing device having a power source for selectively indexing the turret heads, a power source for rotating the spindle and the tool spindles, and a transmitting device for transmitting the power of the power source selectively to the spindle and the tool spindles.

BRIEF DESCRIPTION OF THE DRAWINGS

The foregoing and other objects of the present invention will be more fully appreciated as the same becomes better understood from the following detailed description of a preferred embodiment when considered in a connection with the accompanying drawings, in which like reference numerals designate like or corresponding parts throughout the several views, and wherein.

DESCRIPTION OF THE PREFERRED EMBODIMENT

Figure 1:
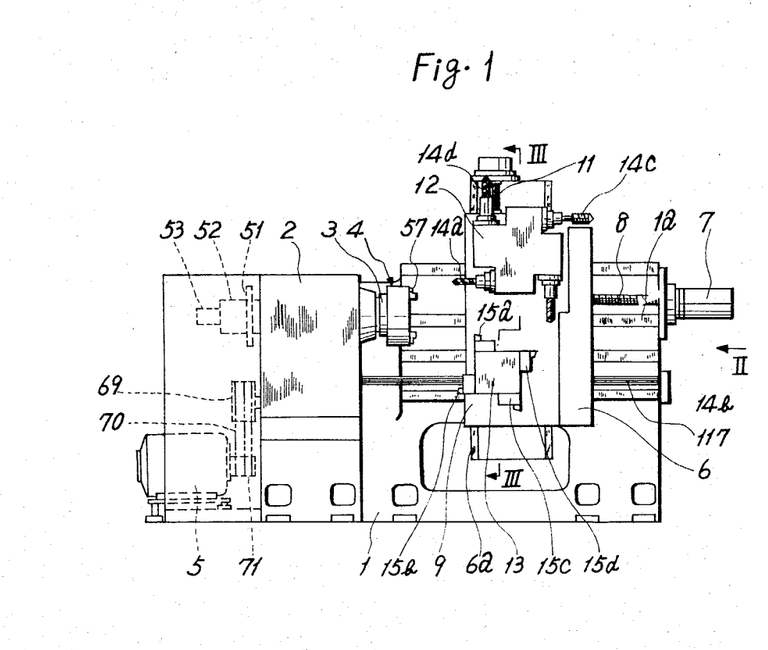
FIG. 1 is a front view showing a preferred embodiment of the present invention.
Figure 2:
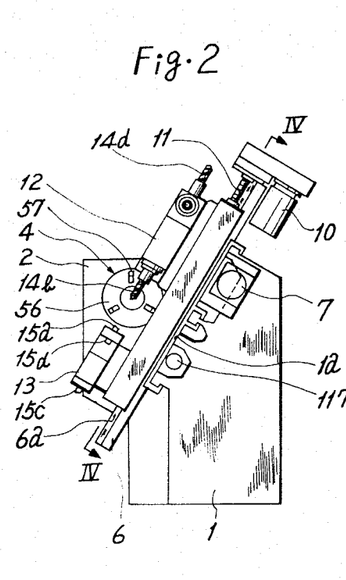
FIG. 2 is a right side view taken along the arrow II of FIG. 1.
Figure 6:
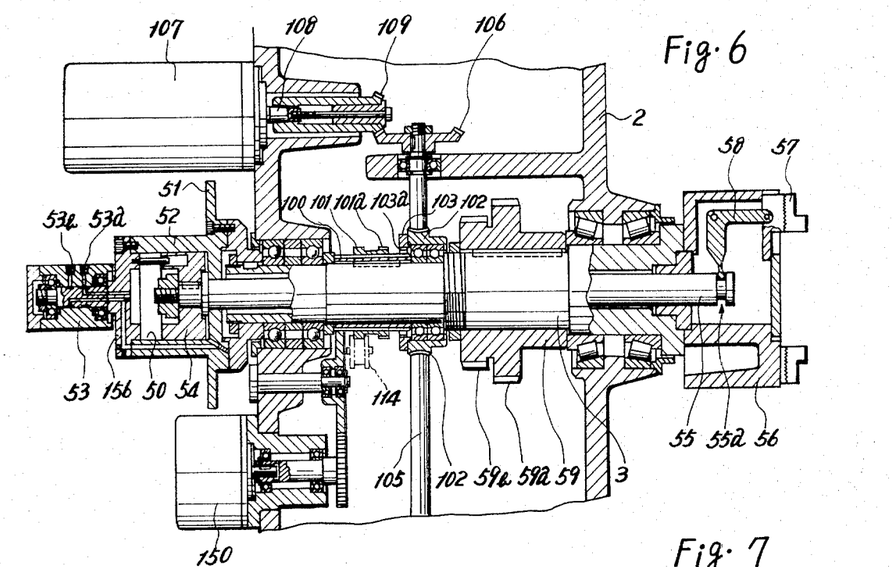
FIG. 6 is a fragmentary sectional view showing a driving device for a main spindle of a preferred embodiment, taken along the line VI—VI of FIG. 7.

The whole constitution of a machine tool according to the present invention is shown in FIGS. 1 and 2. A bed 1 fixedly mounts a headstock 2 on which a main spindle 3 is rotatably mounted by bearings as shown in FIG. 6. A chuck 4 is fixedly held at one end of the main spindle 3, while a brake device, not shown, is fixedly held at the other rear end thereof. The main spindle 3 may be rotated by a motor 5 through driving means described hereinafter.

Figure 4:
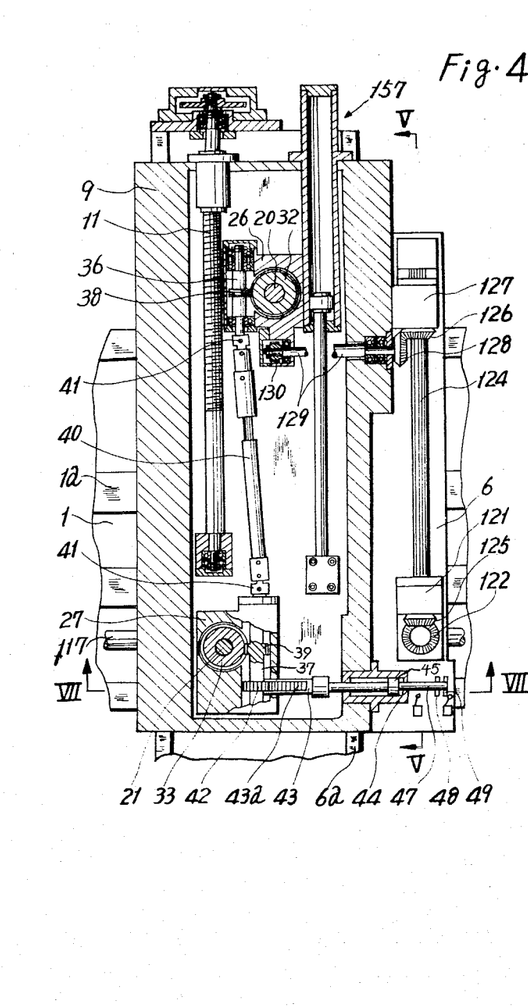
FIG. 4 is an enlarged sectional view taken along the line IV—IV of FIG. 2.

A saddle 6 is slidably mounted on a plurality of vertically spaced guideways 1a which are formed on an inclined surface of the bed 1 in parallel relation with the axis of the main spindle 3. The saddle 6 is longitudinally moved by a pulse motor 7 mounted on the bed 1 to rotate a feed shaft 8 threadedly engaged therewith. A cross slide 9 is slidably mounted on laterally spaced guideways 6a which are formed on the saddle 6 perpendicular to the moving direction of the saddle. The cross slide 9 is vertically, or transversely, moved by another pulse motor 10 mounted on the saddle 6 to rotate a feed shaft 11 threadedly engaged therewith. A hydraulic counter-balancer 157, shown in FIG. 4, is provided between saddle 6 and cross slide 9 to balance the weights of cross slide 9.

First and second turret heads 12 and 13 are indexably mounted on the cross slide 9 being spaced apart in the moving direction of the cross slide 9, and being selectively rotated by driving means described hereinafter. A plurality of rotary cutting tools 14a through 14d are rotatably carried on the first turret head 12, which is adapted to drivingly receive various kinds of such rotary cutting tools, such as for example, a drill, a reamer, a tap, a T-slot cutter and a holder for single point tools, in accordance with various machining operations. The second turret head 13 serves to fixedly mount a plurality of stationary cutting tools 15a through 15d. As shown in FIG. 2, the axes of tools 14a through 14d all lie in a plane passing through the axis of the main spindle 3.

Figure 3:
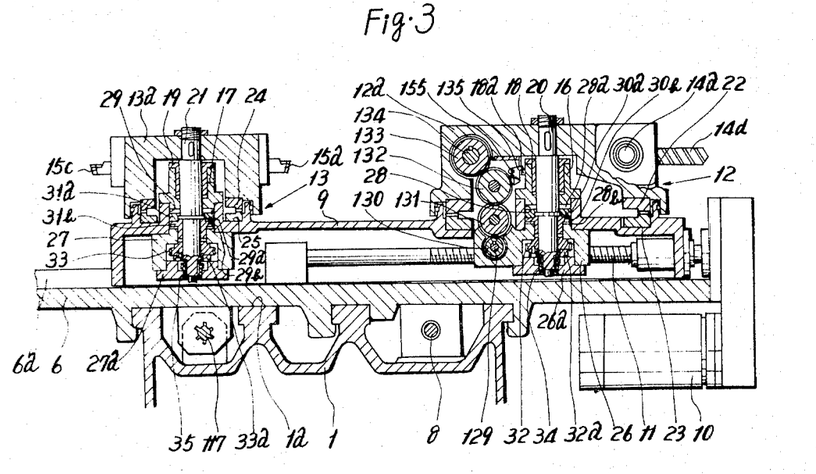
FIG. 3 is an enlarged sectional view showing the turret heads, a cross head, and a saddle of the present invention, taken along the line III—III of FIG. 1.

The turret heads 12 and 13 are operably carried on the cross slide 9 by the same construction. Bearing sleeves 16 and 17 are vertically secured to the ends of cross slide 9, as shown in FIG. 3, and shafts 20 and 21 are rotatably and vertically slidably mounted in the bearing sleeves 16 and 17 through bearing inserts 18 and 19, respectively. The first and second turret heads 12 and 13 are secured to the ends of shafts 20 and 21, respectively. An upper curvic coupling member 22 is secured to the lower end of the turret head 12, while a lower mating curvic coupling member 23 is secured to the cross slide 9 opposite the upper member 22. The pair of curvic coupling members 22 and 23 serve to accurately index and fixedly position the first turret head 12 so that a desired tool may face the chuck 4. Similarly, a pair of curvic coupling members 24 and 25 are secured to the second turret head 13 and the cross slide 9, respectively, to index and fixedly posiion the second turret head 13 so that the cutting edge of a desired stationary cutting tool may face the axis of main spindle 3.

Brakcets 26 and 27 are fixedly mounted on the cross slide 9 in coaxial relation with the sleeves 16 and 17 to form cylinders 28 and 29, respectively. Piston members 30a and 30b secured to a flange on shaft 20 are slidably received in the cylinder 28. Similarly, piston members 31a and 31b secured to a flange on shaft 21 are slidably received in the cylinder 29. Worm wheels 32 and 33 are rotatably mounted on the shafts 20 and 21 within bores formed in the brackets 26 and 27, respectively, and rings 32a and 33a having internal spline teeth are coaxially secured to the lower end faces of the worm wheels 32 and 33, respectively. Lower caps 26a and 27a are fixedly mounted on the lower ends of brackets 26 and 27 in abutting engagement with the rings 32a and 33a so as to restrain against their axial displacements. Clutching gears 34 and 35 are secured to the lower ends of shafts 20 and 21 so that they may be brought into meshing engagement with the rings 32 a and 33a, respectively, when the shafts 20 and 21 are upwardly moved.

As shown in FIG. 4, the brackets 26 and 27 rotatably mount shafts 36 and 37 on which worms 38 and 39 are formed for meshingly engaging the worm wheels 32 and 33, respectively. Shafts 36 and 37 are interconnected by a shaft 40 and universal joints 41. A pinion 42 is keyed to the shaft 37 to meshingly engage rack teeth 43a formed on a rack bar 43, the end of which is connected to a piston 45 slidably received in a cylinder 44 formed on the cross slide 9. Dogs 48 and 49 threadedly secured on a piston rod 47 projecting beyond the cylinder 44 from the piston 45 confirm forward and rear limits of movement of the piston 45.

An indexing operation of the turret head 12 is described hereunder. Fluid under pressure is applied to the lower chamber 28b of cylinder 28 to move the shaft 20 upwardly, thereby bringing the clutching gear 34 into meshing engagement with the ring 32a. Simultaneously, the curvic coupling members 22 and 23 are disengaged to permit the indexing rotation of shaft 20. Then, fluid under pressure is applied to a right chamber of cylinder 44 to move the piston 45 leftwardly. The shaft 37, FIG. 4, is rotated in response to the sliding movement of rack bar 43 through the driving engagement of rack teeth 43a and pinion 42. When the piston 45 is moved to its forward limit, the dog 48 operates a limit switch to apply fluid pressure to the upper chamber 28a. The first turret head 12 is thus downwardly moved thereby to meshingly engage the pair of curvic coupling members 22 and 23. The first turret head 12 is indexed in this manner to a succeeding position, through rotation of worm 32, ring 32a, gear 34 and shaft 20. Similarly, the second turret head 13 is indexed by rotating worm 33, ring 33a, gear 35 and shaft 21 after the shaft 21 is raised by supplying fluid under pressure to lower chamber 29b of cylinder 29 to bring the clutching gear 35 and ring 33a into engagement.

The construction of headstock 2 will be described below with reference to FIG. 6. To the rear or left end of main spindle 3 there is secured a cylinder member 52 on which a cylinder 50 and a brake-disc 51 are formed. A distributor 53 is connected to the cylinder member 52 through a cylinder cap 156. A piston 54 is slidably received in the cylinder 50. A piston rod 55 fixed to piston 54 is slidably mounted axially throughout the main spindle 3 and projects beyond the front end of the main spindle 3 into the chuck 4. Ports 53a and 53b are connected to the left and right chambers of cylinder 50, respectively, through passages formed in the cylinder cap 156 and the cylinder member 52. The ports 53a and 53b are connected to a fluid pressure source through a change-over valve, not shown. To the front or right end of main spindle 3 is secured a chuck body 56 on which a plurality of clamping fingers 57 are movably mounted in the radial direction. A plurality of L-shaped links 58 are pivotally mounted in the chuck body 56, one end of each of the links 58 being pivotally connected to a respective clamping finger 57, while the other end of the links 58 are engaged with a peripheral groove formed on the end of the piston rod 55. Therefore, the clamping fingers may be radially moved in response to axial movement of piston 54 through the links 58 to clamp or release a workpiece. The brake-disc 51 serves to brake the main spindle 3 or to provide stopping power in association with other components, not shown, of the brake device.

Figure 7:
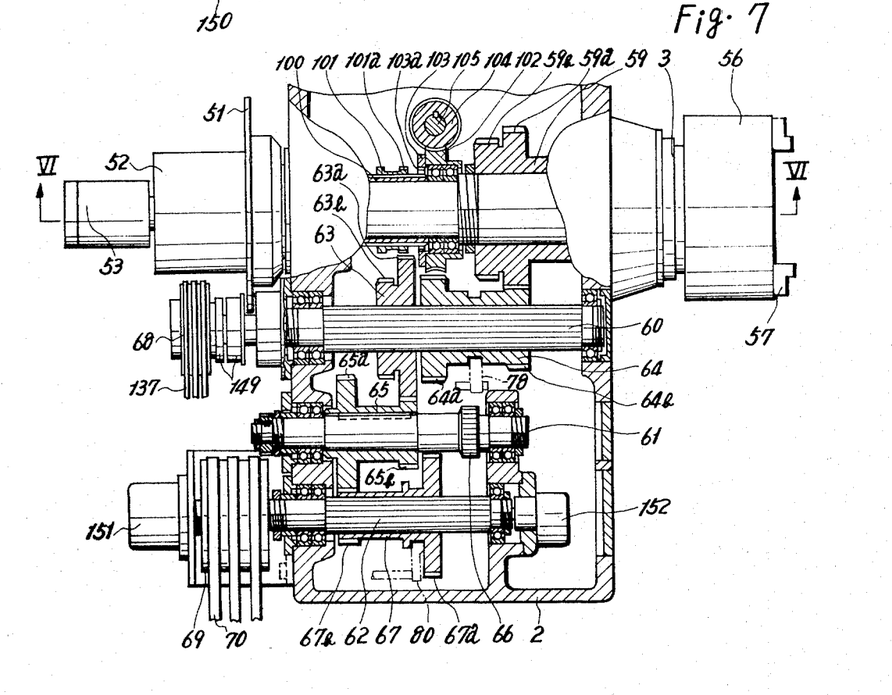
FIG. 7 is a developed view showing a transmission of a main spindle in cross section.

The driving mechanism of main spindle 3 is described below. On the main spindle 3 a gear member 59 is securedly mounted having a larger gear 59a and a smaller gear 59b thereon. As shown in FIG. 7, a gear member 64 having a smaller gear 64b and a larger gear 64a thereon is slidably mounted in splined engagement with a spline shaft 60 which is rotatably mounted on the headstock 2 in parallel relation with the main spindle 3. Another gear member 63 having a larger gear 63a and a smaller gear 63b is also slidably mounted in splined engagement with the spline shaft 60, being disposed rearwardly of gear 64. A gear member 65 having a larger gear 65a and a smaller gear 65b is keyed to a shaft 61 rotatably mounted on the headstock 2. Another gear 66 is formed on the body of the shaft 61. A gear member 67 having a larger gear 67a and a smaller gear 67b is slidably mounted in a spline engagement with a spline shaft 62 which is rotatably mounted on the headstock 2 in parallel relation with the shaft 61. The spline shaft 62 may be drivingly engaged with the shaft 61 by the meshing engagement of smaller gear 67b with larger gear 65a or by the meshing engagement of larger gear 67a with gear 66. The shaft 61 is brought into driving engagement with the spline shaft 60 by the meshing engagement of smaller gear 65b with larger gear 63a as shown in FIG. 7. The smaller gear 64b of gear 64 is in meshing engagement with the larger gear 59a of spindle 3. A pulley 69 is fixedly mounted on a projected end of spline shaft 62 in driving engagement with a pulley 71. FIG. 1, fixedly mounted on an output shaft of motor 5 through pulley belts 70. Gears 63, 64 and 67 are selectively shifted by a well-known shifting device comprising a hydraulic cylinder actuator and a forked shifter, shown by phantom lines in FIGS. 6 and 7, respectively. The forked shifter are selectively operated to transmit a selected rotation from the motor 5 to the main spindle 3 or any one of the rotary cutting tools 14a through 14d.

On the spindle 3 is keyed a sleeve 100, FIG. 6, having involute teeth thereon, on which a sliding ring 101 is slidably mounted in the axial direction. Spline teeth 101a are formed on the right peripheral projection of sliding ring 101. On the spindle 3 a worm wheel 102 is rotatably mounted, to the left end of which a connecting ring 103 is secured. Spline teeth 103a are formed on the internal surface of connecting ring 103 so as to be engageable with the spline teeth 101a. The left peripheral projection of sliding ring 101 is loosely engaged with a peripheral groove of a shifter 114 which is secured to a piston rod of a hydraulic actuator, not shown. In FIG. 7 a worm 104 is keyed to a worm shaft 105 rotatably mounted on the headstock 2 and perpendicularly oriented relative to spindle 3. The worm 104 is normally meshed with the worm wheel 102. On the top of worm shaft 105 there is secured a bevel gear 106, FIG. 6, which is meshed with a bevel gear 109 keyed to an output shaft 108 of a pulse motor 107. The pulse motor 107 is rotated in accordance with pulses applied thereto, as is well known to those skilled in the art. The shifter 114 is rightwardly movable by the hydraulic actuator so that the spline teeth 101a of sliding ring 101 may be brought into meshing engagement with the connecting ring 103. Thus, the spindle 3 is drivingly engaged with the output shaft 108 through the gearings. The pulse motor 107 is this operative to rotate spindle 3 to index a workpiece fixed by the clamping fingers 57, for example, in a drilling operation, and to rotate the workpiece at a desired rate.

The rotation of spline shaft 60 is transmitted to the first turret head 12 through a power-transmitting mechanism, which will be described in detail hereunder.

Figure 5:
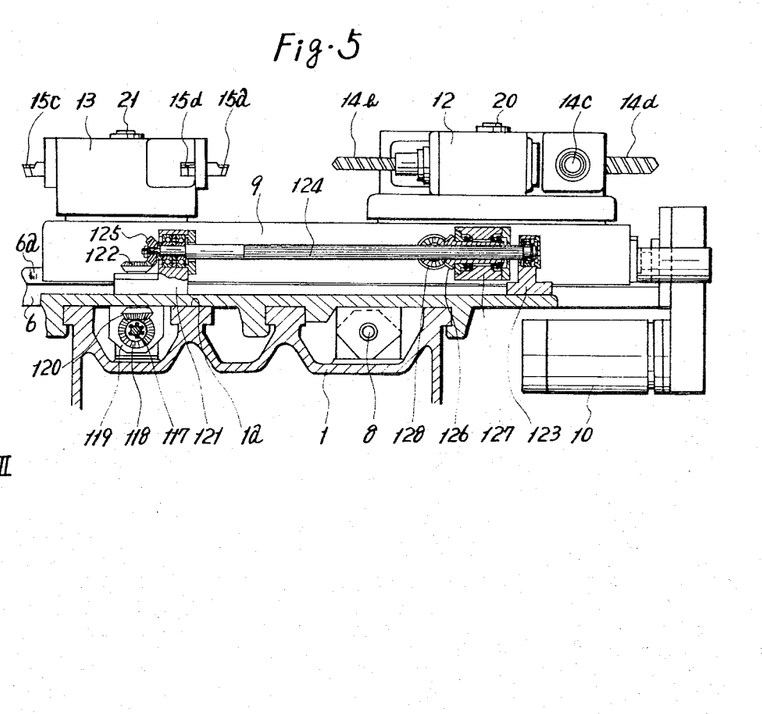
FIG. 5 is a sectional view taken along the line V—V of FIG. 4.
Figure 8:
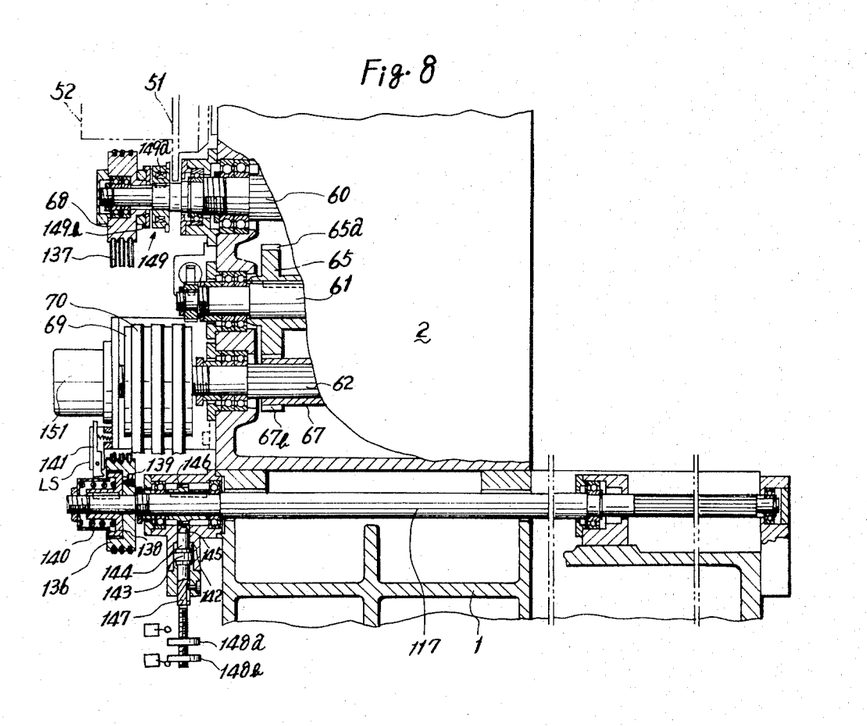
FIG. 8 is an enlarged and fragmentary sectional view showing a transmitting device.

A spline shaft 117 is rotatably mounted on the bed 1 being restrained from axial movement, as shown in FIG. 8. A bevel gear 118, FIG. 5, is rotatably mounted on a gear box 119 secured to the lower surface of saddle 6 and is also in spline engagement with the spline shaft 117. The bevel gear 118 is meshed with a bevel gear 120 rotatably mounted on the saddle 6 in a direction perpendicular to the spline shaft 117. Since the bevel gear 118 is movable on the spline shaft 117 in accordance with the sliding movement of saddle 6, the bevel gear 118 is normally held in meshing engagement with the bevel gear 120 in spite of the sliding movement of saddle 6. The bevel gear 120 is connected to a bevel gear 122 which is rotatably mounted on an L-shaped bracket 121 secured on the left end of saddle 6. A spline shaft 124 is rotatably mounted in the direction perpendicular to the spline shaft 117 on the L-shaped bracket 121 at one end thereof and on a bearing bracket 123 at the other end thereof, as shown in FIG. 5. A bevel gear 125 is secured to the left end of spline shaft 124 in noraally meshing engagement with the bevel gear 122. On the side of cross slide 9 is fixedly mounted a bearing support 127 wherein a bevel gear 126 is rotatably mounted also being in spline engagement with the spline shaft 124. A bevel gear 128 is rotatably mounted on the cross slide 9 and connected to a shaft 129, as shown in FIG. 4. The shaft 129 is rotatably mounted on the cross slide 9 in parallel with the axis of spindle 3. Thus, the bevel gear 126 is normally held in meshing engagement with the bevel gear 128 in spite of the sliding movement of cross slide 9.

In FIGS. 3 and 4, a gear 130 is secured to the end of shaft 129 to be meshed with a gear 131 rotatably carried on the cross slide 9. Gears 132 and 133 are rotatably carried on the body 12a of the first turret head 12 so as to be meshed to each other. The gear 133 is keyed to a tool spindle 134 serving to drivingly receive a drill 13a. FIG. 1, in a well known manner. The remaining three tool spindles, as well as the tool spindle 134, are rotatably mounted on the body 12a. The same gearing as the gears 132 and 133 are provided for each tool spindle. Detents 135 are rotatably mounted on the body 12a so that when the turret head 12 is upwardly moved to be indexed and the gears 132 are brought out of meshing engagement with the gears 131, the detents 135 are engaged with the gears 132 to prevent the gears 132 and 133 from unnecessary rotation. Therefore, the gears 132 are smoothly meshed with the gears 131 when the turret head 12 is downwardly moved after the indexing operation is completed. Although the detents 135 are normally urged by springs 155 toward the gears 132, the detents 135 are held out of engagement with the gears 132 by their engagement with a pin 18a secured to the sleeve 16 when the turret head 12 is positioned at its normal or down position. Since the pin 18a is provided only at the position where a desired tool is indexed, the other gears 132 are held in fixed engagement with detents 135 in spite of the up and down movements of turret head 12.

The left end of spline shaft 117, FIG. 8 projects beyond the headstock 2 and rotatably mounts a pulley 136. The pulley 136 is drivingly connected to the pulley 68 through belts 137, fragmentarily shown. To the spline shaft 117 is slidably keyed a clutch disk 138 which is normally urged toward the left side of pulley 136 by a spring 140 to be drivingly engaged with the pulley 136. A bolt 139 is threaded with the pulley 136 and has a conical projection at the end thereof to engage with a conical recess formed on the clutch disk 138. A limit switch LS has an action lever 141 thereon to be operated by the leftward movement of disk 138. In case an excessive load is applied to the spline shaft 117, the clutch disk 138 is moved away from the pulley 136 along the slope of the conical surface against the force of spring 140. Then, the action lever 141 is rotated by the clutch disk 138 to operate the limit switch LS, thus stopping the rotations of motor 5 and pulse motors 7 and 10.

A cylinder 142, FIG. 8, is mounted on the left side of bed 1 in a direction perpendicular to the spline shaft 117 to slidably receive a piston 143 therein. A piston rod 144 of piston 143 has an engaging projection 145 at the end thereof for engaging a gear 146 keyed to the spline shaft 117 when the piston 143 is moved toward the shaft 117. Dogs 148a and 148b are adjustably secured to a lower piston rod 147 of piston 143 to confirm the forward and retracting limits, respectively, of piston 143 Since the engagement of projection 145 with the gear 146 restrains the rotation of spline shaft 117 and gears 131. FIG. 3, the gear 131 is smoothly meshed with the gears 132 when the first turret head 12 is downwardly moved in its index operation.

A magnetic clutch 149, FIG. 8, is interposed between the spline shaft 60 and the pulley 68 rotatably mounted on the end of spline shaft 60 to selectively interconnect them. A magnet 149a is keyed to the spline shaft 60 and magnetically engages a plate 149b slidably engaged to the pulley 68 when it is energized. In the case of a turning operation by the stationary cutting tools 15a through 15d of the second turret head 13, the magnet 149a is de-energized thereby to release the driving engagement between the pulley 68 and the spline shaft 60. The rotation of motor 5 is transmitted to the main spindle 3 through the pulley belts 70 and the gearing in the headstock 2 to rotate a workpiece fixed to the chuck body 56. In the case of a drilling operation by the drills 14a through 14d of the first turret head 12, the forked shifter 78, FIG. 7, is rightwardly moved by the fluid actuator to release the gear 64b from meshing engagement with the gear 59 of main spindle 3. When the gear shifting operation is accomplished, the magnet 149a is energized thereby to drivingly engage the pulley 68 with the spline shaft 60. Thus, the rotation of motor 5 is transmitted to the first turret head 12 through the pulley belts 137, the spline shafts 117 and 124, and the bevel-gearings, FIGS. 4 and 5, as mentioned above. Moreover, a numeral 150, FIG. 6, designates a well-known position coder for screw thread cutting, a numeral 151, FIG. 7, designates a well-known zero-speed switch for the braking operation of rotating tools 14a through 14d of the first turret head 12, and a numeral 152 designates a lubricating pump.

The operation of the aforementioned construction will be described hereunder. In the turning operation by the stationary cutting tools 15a through 15d, a workpiece is fixed to the chuck 4 by the clamping fingers 57. Next, the second turret head 13, FIG. 3, is lifted to release the meshing engagement of upper and lower members 24 and 25 of the curvic coupling. For the purpose of indexing the following tool 15b in place of the tool 15a, FIG. 1, to a machining zone, the piston 45, FIG. 4, is leftwardly moved by fluid under pressure being applied to the right chamber. The pinion 42 is clockwisely rotated by the rack bar 43 connected to the piston 45. Rotation of the pinion 42 is transmitted to the worm wheel 33 through the worm 39, thus rotating the second turret head 13 by 90°. The second turret head 13 is stopped at the new indexed angular position when the limit switch is operated by the dog 48. In turn, the second turret head 13 is downwardly moved. The upper member 24 of the curvic coupling is brought into meshing engagement with the lower member 25 and is normally urged toward the lower member 25 so that the second turret head 13 may be fixedly mounted on the cross slide 9. With the disengagement of clutching gear 35 and ring 33a by the lowering of shaft 21, the rack bar 43 is retracted to its normal position by applying fluid under pressure to the left chamber of cylinder 44. In the headstock 2, the rotation speed of the workpiece is set by the selective operation of cylinders for the forked shifters 78 and 80. The forked shifter 114 is held at the left limit thereof so as not to engage the sliding ring 101 with the connecting ring 103 of worm wheel 102, as shown in FIG. 7. The magnet 149a, FIG. 8, is de-energized to make the magnetic clutch 149 inoperative, thus disengaging the spline shaft 60 from the pulley 68. The motor 5, FIG. 1, is energized to rotate the chuck 4 through the selected gear train. The cross slide 9 is transversely moved to feed the indexed tool 15b in the radial direction of the clamped workpiece, and the saddle 6 is longitudinally moved to feed the indexed tool 15b in the axial direction of the workpiece.

In the case of a drilling operation, the magnetic clutch 149 is operated to connect the spline shaft 60 with the pulley 68. The forked shifter 78 is moved rightwardly by te hydraulic actuator and the gear 64 is moved rightwardly so as to be free from meshing engagement with the gear 59, FIG. 7, so that the rotation of motor 5 is not transmitted to the main spindle 3. Next, the first turret head 12 is indexed to face one of the rotary cutting tools, for example the drill 14b, in the direction of the workpiece. For the indexing operation, the piston 143, FIG. 8, is first moved toward the gear 146 to restrain the spline shaft 117 against rotation. The first turret head 12, FIG. 3, is then lifted to release the meshing engagement of coupling members 22 and 23 and simultaneously to engage the clutching gear 34 with the ring 32a of worm wheel 32. Then, the detent 135 is brought into engagement with the gear 132 to fix the angular position of gear 132. When the piston 45, FIG. 4, is moved to the left, the pinion 42 is clockwisely rotated by the rack bar 43. The rotation of pinion 42 is transmitted to the work wheel 32 through the worm of shaft 36, the shaft 40, and the universal joints 41, thus rotating the first turret head 12 by 90°. When the limit switch is operated by the dog 48, the first turret head 12 is stopped at the new indexed angular position. In turn, the first turret head 12 is moved downwardly to its normal position, and the upper member 22 is brought into meshing engagement with the lower member 23 and is normally urged toward the lower member 23 so that the first turret head 12 may be fixedly mounted on the cross slide 9. The gear 132 is smoothly meshed with the gear 131 because both of the gears 132 and 131 are angularly fixed by the detent 135 and the engaging projection 145 of piston rod 144, FIG. 8, respectively, during the disengagement thereof. After the first turret head 12 is clamped, the detent 135 and the engaging projection 145 are taken out of engagement with the gears 132 and 146, respectively. Upon disengagement of the clutching gear 34 from ring 32a by the lowering of shaft 20, the rack bar 43 is retracted to its normal position. To index the chuck 56, FIG. 6, the sliding ring 101 is moved to the right by the shifter 114, FIG. 6, so that the main spindle 3 is drivingly engaged with the worm wheel 102. The magnet 149, FIG. 8, is energized to connect the spline shaft 60 with the pulley 68. The motor 5, FIG. 1, is energized to rotate the drill 14b. The rotation speed of drill 14b is set by the selective operation of the hydraulic actuators for the forked shifters. The cross slide 9 is transversely moved by the pulse motor 10 to position the axis of tool spindle 134 relative to the workpiece. The chuck 4 is then rotated by the pulse motor 107 so that the rotational center of the tool spindle 134 may be angularly positioned at the desired drilling portion of the workpiece. Movement of the saddle 6 longitudinally is effected by the pulse motor 7 to axially feed the rotating drill 14b, thus drilling the workpiece. In case the workpiece has concentrically a plurality of drilling portions, the pulse motor 107 rotates the main spindle 3 by each predetermined angle to angularly position the following drilling portion on the axis of drill 14b each time one drilling bore is accomplished. After the drilling operation is complete, a power circuit of motor 5 is changed so as to reversely energize the motor 5, thus braking the motor. When the rotational speed of motor 5 becomes almost zero, the zero-speed switch 151 is energized to break the power circuit for stopping the drill 14b of the first turret head 12.

As occasion demands, a desired tool within the various tools stored in the first and second turret heads 12 and 13 may be indexed at the machining zone by the aforementioned indexing operations, and either the turning or the drilling operation may be performed by the operations of magnet clutch 149, the shifting operation of gear 64, the transverse operation of cross slide 9, and the longitudinal operation of saddle 6. Furthermore, a boring operation may be executed by a boring tool carried on the first turret head.

Although certain specific embodiments of the invention have been shown and described, it is obvious that many modifications and variations thereof are possible in light of the above teachings. It is to be understood therefore, that within the scope of the appended claims, the invention may be practiced otherwise than as specifically described herein.

What is claimed as new and desired to be secured by LETTERS PATENT of the UNITED STATES is:

1. A machine tool for performing a variety of machining operations, comprising:
   a frame;
   a spindle rotatably mounted on said frame;
   a saddle slidably mounted on said frame;
   a cross slide slidably mounted on said saddle;
   a first turret head having means for rotatably mounting a plurality of tool spindles for drivingly receiving rotary cutting tools;
   a second turret head having means for mounting stationary cutting tools, said first and second turret heads being indexably mounted in spaced-apart relation on said cross slide;
   a power driving member for rotating said spindle and said tool spindles;
   means mounted on said spindle for drivingly supporting a workpiece;
   means mounted on said frame for indexing said spindle;
   means mounted on said frame for sliding said saddle;
   means mounted on said saddle for sliding said cross slide;
   means mounted on said cross slide for indexing said first and said second turret heads; and
   means for transmitting the power of said power driving member selectively to said spindle and said tool spindles.

2. A machine tool according to claim 1, wherein said spindle indexing means comprises:
   a pulse motor on said frame for rotating said spindle in accordance with pulses applied thereto; and
   a clutching device for selectively connecting said pulse motor with said spindle.

3. A machine tool according to claim 1, wherein said first and said second turret heads each individually comprises:
   a shaft slidably and rotatably mounted on said cross slide;
   a body secured to said shaft for supporting said cutting tools;
   a pair of co-operatively intermeshing disengagable coupling members respectively secured to said body and said cross slide for retaining said body in a selected position;
   a pair of co-operatively disengagable clutching members, one of said members being rotatably mounted on said shaft, the other of said members being fixedly secured to said shaft;
   a driving gear concentrically secured to one of said clutching members; and
   first power operable means connected to move said body axially in one direction for disengaging said coupling members and engaging said clutching members, said members being reversely operative to move said body axially in the opposite direction to re-engage said coupling members for effecting final angular positioning movement of said body and to disengage said clutching members; and further
   wherein said indexing means for said first and second turret heads comprises
   a second power operable means common to said first and said second turret heads being normally engaged with said driving gear for rotating said body a predetermined angle upon engagement of said clutching members.

4. A machine tool according to claim 3, in which said second power operable means comprises:
   a cylinder mounted on said cross slide;
   a piston slidably received in said cylinder;
   a rack bar connected to said piston;
   a driving shaft rotatably mounted on said cross slide;
   a gear secured to said driving shaft in meshing engagement with said rack bar; and
   another gear secured to said driving shaft and normally meshed with said driving gear.

5. A machine tool according to claim 3, wherein said first turret head further comprises:
   driven gears respectively connected to said tool spindles;

a driving gear rotatably mounted on said cross slide and intermeshingly disengagable to drive one of said driven gears upon engagement of said coupling members;

detents pivotably mounted on said body for fixing the angular position of each of said driven gears;

spring means for urging said detents to be engaged with said driven gears;

a pin secured to said cross slide to rotate one of said detents against the force of said spring means for causing one of said detents to disengage the one of said driven gears upon the engagement of said coupling members; and means for fixing the angular position of said driving gear relative to said driven gears upon disengagement of said coupling members.

6. A machine tool according to claim 1, wherein said transmitting means comprises:

a transmission for changing the rotational speed being transmitted from said power driving member;

a first clutch disposed between said transmission and said spindle;

a first spline shaft rotatably mounted on said frame along the sliding direction of said saddle;

a second clutch disposed between said transmission and said first spline shaft;

a second spline shaft rotatably mounted on said saddle along the sliding direction of said cross slide;

a first gearing mounted on said saddle for drivingly connecting said first spline shaft with said second spline shaft;

driven gears respectively connected to said tool spindles;

a driving gear rotatably mounted on said cross slide to selectively drive one of said driven gears; and a second gearing mounted on said cross slide for drivingly connecting said second spline-shaft with said driving gear.

7. A machine tool according to claim 6, further comprising:

a driven member rotatably mounted on said first spline shaft and drivingly connected to said transmission through said second clutch;

a friction coupling member slidably keyed to said first spline shaft, said friction coupling member having conical recesses therein;

spring means disposed to resiliently urge said friction coupling toward said driven member for drivingly connecting said friction coupling member with said driven member;

conical projection members secured to said driven member to complementarily engage said conical recesses for axially shifting said friction coupling member under the excessive load applied to said first spindle shaft; and switching means adjacent said friction coupling member to be operated by the axial shift of said friction coupling member for stopping said motor.

8. A machine tool for performing a variety of machining operations, comprising:

a bed having inclined and vertically spaced guide ways thereon;

a headstock mounted on said bed;

a spindle rotatably mounted on said headstock, the axis of said spindle being parallel with said guide ways;

a saddle slidably mounted on said guide ways, said saddle having laterally spaced guide ways thereon;

a cross slide slidably mounted on said laterally spaced guide ways;

a first turret head indexably mounted on the upper portion of said cross slide having means for rotatably mounting a plurality of tool spindles adapted to drivingly receive rotary cutting tools;

a second turret head indexably mounted on the lower portion of said cross slide having means for mounting stationary cutting tools;

a power driving member for rotatinging said spindle and said tool spindles;

means mounted on said spindle for drivingly supporting a workpiece;

means mounted on said bed for indexing said spindle;

feed means mounted on said bed for moving said saddle toward and away from said workpiece supporting means;

feed means mounted on said saddle for transversely moving said cross slide;

means mounted on said cross slide for indexing said first and said second turret heads; and means for transmitting the power of said power driving member selectively to said spindle and said tool spindles.

9. A machine tool according to claim 8, wherein said power-transmitting means comprises:

a transmission for changing the rotational speed being transmitted from said power driving member;

a first clutch disposed between said transmission and said spindle;

a first spline shaft rotatably mounted on said bed along the sliding direction of said saddle;

a second clutch disposed between said transmission and said first spline shaft;

a second spline shaft rotatably mounted on said saddle along the sliding direction of said cross slide;

first gearing mounted on said saddle for drivingly connecting said first spline shaft with said second spline shaft;

driven gears respectively connected to said tool spindles;

a driving gear rotatably mounted on said cross slide to selectively drive one of said driven gears; and second gearing mounted on said cross slide for drivingly connecting said second spline shaft with said driving gear.

10. A machine tool according to claim 8, wherein each of said first and said second turret heads individually comprises:

a shaft slidably and rotatably mounted on said cross slide;

a body secured to said shaft for rotatably supporting said tool spindles;

a pair of co-operatively intermeshing disengagable coupling members respectively secured to said body and said cross slide for retaining said body in a selected position;

a pair of co-operatively disengagable clutching member, one of said members being rotatably mounted on said shaft, the other of said members being fixedly secured to said shaft;

a driving gear concentrically secured to the one of said clutching members; and first power operable means connected to move said body axially in one direction for disengaging said coupling members and engaging said clutching members, said members being reversely operative to move said body axially in the opposite direction to re-engage said coupling members for effecting final angular positioning movement of said body and to disengage said clutching members;

and wherein said indexing means of said first and said second turret heads comprises second power operable means common to said first and said second turret heads and normally engaged with said driving gear for rotating said body through a predetermined angle upon engagement of said clutching members.

11. A machine tool according to claim 10, in which said second power operable means comprises:

a cylinder mounted on said cross slide;
a piston slidably received in said cylinder;
a rack bar connected to said piston;
a driving shaft rotatably mounted on said cross slide;
a gear secured to said driving shaft in meshing engagement with said rack bar; and
gears secured to said driving shaft and normally meshed with said driving gears.

12. A machine tool according to claim 8, wherein said first turret head further comprises:

driven gears respectively connected to said tool spindles;

a driving gear rotatably mounted on said cross slide and intermeshingly disengagable to drive one of said driven gears upon engagement of said coupling members;

detents pivotably mounted on said body for fixing the angular position of each of said driven gears;

spring means for urging said detents to be engaged with said driven gears;

a pin secured to said cross slide to rotate one of said detents against the force of said spring means for causing one of said detents to disengage the one of said driven gears upon engagement of said coupling members; and means for fixing the angular position of said driving gear relative to said driven gears upon disengagement of said coupling members.

* * * * *